United States Patent
Käsbauer

(10) Patent No.: US 8,336,523 B2
(45) Date of Patent: Dec. 25, 2012

(54) METHOD AND DEVICE FOR DETERMINING AN OPTIMIZED EMERGENCY RUNNING FUNCTION IN A FAULT-AFFLICTED ENGINE OF A MOTOR VEHICLE

(75) Inventor: Michael Käsbauer, Neutraubling (DE)

(73) Assignee: Continental Automotive GmbH, Hannover (DE)

( * ) Notice: Subject to any disclaimer, the term of this patent is extended or adjusted under 35 U.S.C. 154(b) by 586 days.

(21) Appl. No.: 12/521,029

(22) PCT Filed: Oct. 31, 2007

(86) PCT No.: PCT/EP2007/061785
§ 371 (c)(1),
(2), (4) Date: Nov. 11, 2009

(87) PCT Pub. No.: WO2008/080670
PCT Pub. Date: Jul. 10, 2008

(65) Prior Publication Data
US 2010/0059017 A1    Mar. 11, 2010

(30) Foreign Application Priority Data
Dec. 28, 2006 (DE) .......................... 10 2006 061 889

(51) Int. Cl.
*F02D 11/10* (2006.01)

(52) U.S. Cl. ...................................... 123/396; 123/399

(58) Field of Classification Search .................. 123/396, 123/399; 180/65.265, 65.275, 65.285
See application file for complete search history.

(56) References Cited

U.S. PATENT DOCUMENTS

| | | | | |
|---|---|---|---|---|
| 5,447,133 A | * | 9/1995 | Kamio et al. | 123/396 |
| 6,292,730 B1 | * | 9/2001 | Takizawa et al. | 701/51 |
| 6,751,544 B2 | * | 6/2004 | Hashimoto et al. | 701/107 |
| 6,863,051 B2 | * | 3/2005 | Doelker et al. | 123/352 |
| 6,874,471 B2 | * | 4/2005 | Hoshino et al. | 123/399 |
| 6,938,609 B2 | | 9/2005 | Kustosch | |

(Continued)

FOREIGN PATENT DOCUMENTS
DE    4326498 A1    3/1994
(Continued)

OTHER PUBLICATIONS

German Office Action, German application No. 102006061889.0-21, 4 pages, Jun. 18, 2007.
International Search Report, PCT/EP2007/061785, 12 pages, Oct. 31, 2007.

*Primary Examiner* — John T. Kwon
*Assistant Examiner* — Johnny Hoang
(74) *Attorney, Agent, or Firm* — King & Spalding L.L.P.

(57) ABSTRACT

In a motor vehicle having an emergency running device, there is the problem that, in the event of certain fault symptoms occurring, an emergency running function is initiated and the torque of the engine is in the process limited to an unsuitable low value. In the worst case, this can lead to insufficient acceleration, for example during an overtaking maneuver, and to an accident occurring. It is therefore proposed that the determination of an optimized emergency running function be defined as a function both of the present driving state of the motor vehicle and also of the type of fault symptom depending on which the risk and the level of danger are graded into classes and an optimized emergency running function is then determined and initiated. Thus, sufficient torque and rotational speed can be provided for reliable vehicle control even in an unfavorable traffic situation without damaging the endangered components.

20 Claims, 3 Drawing Sheets

U.S. PATENT DOCUMENTS

| | | | | |
|---|---|---|---|---|
| 7,129,593 B2 * | 10/2006 | King et al. | ............... | 290/4 C |
| 7,210,554 B2 * | 5/2007 | Sugiyama et al. | ............ | 180/421 |
| 7,284,538 B2 * | 10/2007 | Ishizuka et al. | ............... | 123/481 |
| 7,328,097 B2 * | 2/2008 | Sawada et al. | ................. | 701/70 |
| 7,415,351 B2 * | 8/2008 | Raichle et al. | ............... | 701/114 |
| 7,631,710 B2 * | 12/2009 | Utsumi | ..................... | 180/65.21 |
| 7,641,009 B2 * | 1/2010 | Akimoto | .................... | 180/65.21 |
| 2003/0150421 A1 | 8/2003 | Kustosch | | |
| 2003/0158639 A1 | 8/2003 | Nada | | |

FOREIGN PATENT DOCUMENTS

| | | |
|---|---|---|
| DE | 19937194 A1 | 2/2001 |
| EP | 1153783 A2 | 11/2001 |
| WO | 0173281 A1 | 10/2001 |
| WO | 2005/052344 A1 | 6/2005 |

* cited by examiner

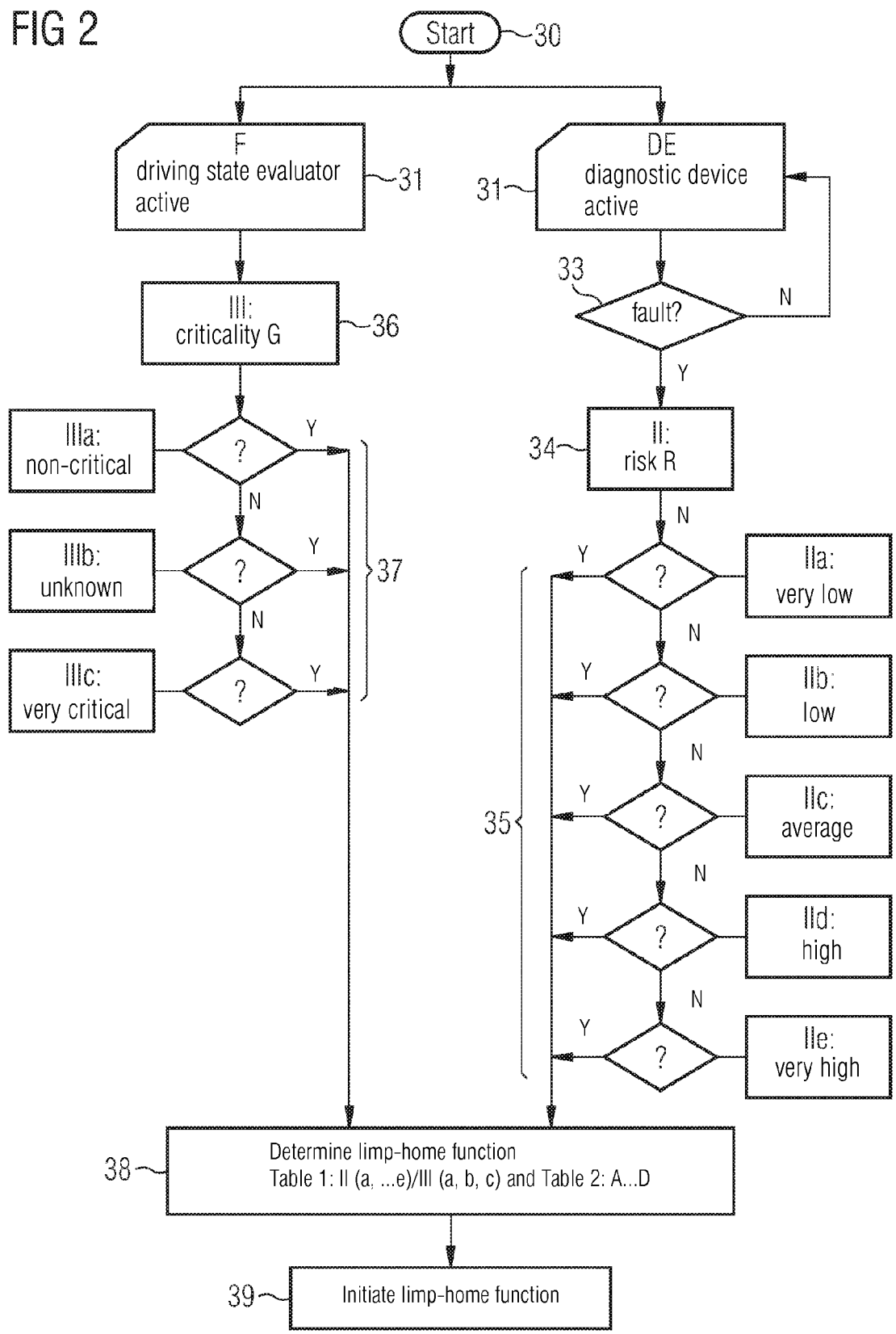

FIG 3

Table 1

Risk (R) →

Criticality ↑

|   | II a | II b | II c | II d | II e |
|---|---|---|---|---|---|
| III a | A | A | A | A | A |
| III b | C | C | D | D | B |
| III c | C | D | D | D | D |

Table 2

|   | Initiate torque/rotational speed limitation | Display |
|---|---|---|
| A | immediately (not in steps or ramp-shaped manner) | INFO: "limitation of torque/rotational speed active" |
| B | immediately but in steps or ramp-shaped manner | INFO: "progressive limitation of torque/rotational speed now active" |
| C | delayed until driving state evaluator displays "non-critical" | INFO/ADVANCE NOTICE: "limitation of torque/rotational speed will be initiated soon". Then: "limitation of torque/rotational speed active" |
| D | as for C, but additionally with maximum time limit | INFO/ADVANCE NOTICE: "limitation of torque/rotational speed will occur at the latest in xxx seconds. Then: "limitation of torque/rotational speed active" |

METHOD AND DEVICE FOR DETERMINING AN OPTIMIZED EMERGENCY RUNNING FUNCTION IN A FAULT-AFFLICTED ENGINE OF A MOTOR VEHICLE

CROSS-REFERENCE TO RELATED APPLICATIONS

This application is a U.S. National Stage Application of International Application No. PCT/EP2007/061785 filed Oct. 31, 2007, which designates the United States of America, and claims priority to German Application No. 10 2006 061 889.0 filed Dec. 28, 2006, the contents of which are hereby incorporated by reference in their entirety.

TECHNICAL FIELD

The present invention relates to a method and/or a device for determining an optimized limp-home function in a motor vehicle engine presenting a fault symptom.

BACKGROUND

It is already known that due to statutory regulations motor vehicles, which are in particular equipped with a diesel- or petrol engine, can continue to be operated in a protected operating mode, i.e. with the aid of a limp-home function, if a fault symptom has been diagnosed in the engine or one of the vehicle units.

It is further known that the limp-home function is implemented as a rule in an engine control unit, which is geared in particular to the tasks of optimum engine control with regard to a maximum torque, minimal exhaust gas emissions and optimum driving comfort. It is however a drawback that, if a fault symptom is detected, for example if a boost pressure sensor of a turbocharged engine is defective and this may lead to serious damage of a relevant component, in this case the exhaust-gas turbocharger, there is no limp-home reaction that is dependent upon the driving state. The result of this is in practice that because of the limitation of the torque the vehicle is no longer capable of greater acceleration, which may be necessary particularly in a critical driving situation. The lack of acceleration of the motor vehicle may therefore lead to endangerment of the driver and the vehicle if the driver as a result of the limitation of the torque is suddenly no longer able to adapt the control of his motor vehicle to the actual traffic situation.

SUMMARY

According to various embodiments, a method and/or a device can be provided, with which the limp-home function is optimized and hence improved.

According to an embodiment, a method of determining an optimized limp-home function for an engine of a motor vehicle, for example an internal combustion engine or an electric motor, the engine being designed with a device, by means of which in the event of a fault symptom the torque and/or the rotational speed of the engine is limited, may comprise the steps of—on the basis of actual values of appropriate vehicle- and/or engine data and/or the previous trend thereof the actual driving state of the motor vehicle is evaluated, —for the evaluated actual driving state of the motor vehicle a classification of the criticality is determined, in particular for the probability that at that moment a critical driving state exists, in which a high torque and/or a high rotational speed is required, for example for an overtaking maneuver,—for a detected fault symptom of the engine or of one of the vehicle devices a classification of the risk of damage occurring to the engine and/or to one of the vehicle devices at a high torque or a high rotational speed is evaluated and—while simultaneously taking the determined classifications of the criticality and the risk into account an optimized limp-home function is determined.

According to a further embodiment, the optimized limp-home function can be initiated immediately if the criticality of the driving state has been classified as "non-critical". According to a further embodiment, the optimized limp-home function can be initiated immediately but in steps or in a ramp-shaped manner if the risk of the fault symptom has been classified as "very high" and the criticality of the driving state has been classified as "unknown". According to a further embodiment, the optimized limp-home function can be initiated in a delayed manner only after the classification of the criticality of the driving state has been brought back from "unknown" or "very critical" to "non-critical" or after a defined time delay has elapsed. According to a further embodiment, a visual and/or audible information- and/or warning message can be output to the driver of the motor vehicle if the torque or the rotational speed of the engine is being limited. According to a further embodiment, for the classification of the risk at least the classes "very low" and "very high" can be defined. According to a further embodiment, for the classification of the criticality at least the classes "non-critical" and "very critical" can be defined. According to a further embodiment, measures for the optimized limp-home function can be stored in the form of a program.

According to another embodiment, in a device for determining an optimized limp-home function for an engine of a motor vehicle for a method as described above,—the motor vehicle and/or the engine comprises a driving state evaluator, a diagnostic device and a limp-home device, a classification of the risk of a detected fault symptom being carried out with the aid of the diagnostic device and a classification of the criticality of the driving state of the motor vehicle being carried out with the aid of the driving state evaluator, and—the limp-home device being designed with an algorithm, by means of which an optimized limp-home function is determinable from the classifications of the risk and the criticality.

According to a further embodiment, the optimized limp-home function can be stored in the form of a program. According to a further embodiment, the driving state evaluator, the diagnostic device and/or the limp-home device can be integrated in an engine control unit.

BRIEF DESCRIPTION OF THE DRAWINGS

An embodiment is represented in the diagrammatic drawings and explained in more detail in the following description.

FIG. 1 shows in a diagrammatic representation a block diagram of an engine according to an embodiment having an intake tract and an exhaust gas tract and FIG. 2 shows, in combination with the Tables 1 and 2 illustrated in FIG. 3, an embodiment of a flowchart, by means of which an optimized limp-home function may be determined.

DETAILED DESCRIPTION

Figure 1:
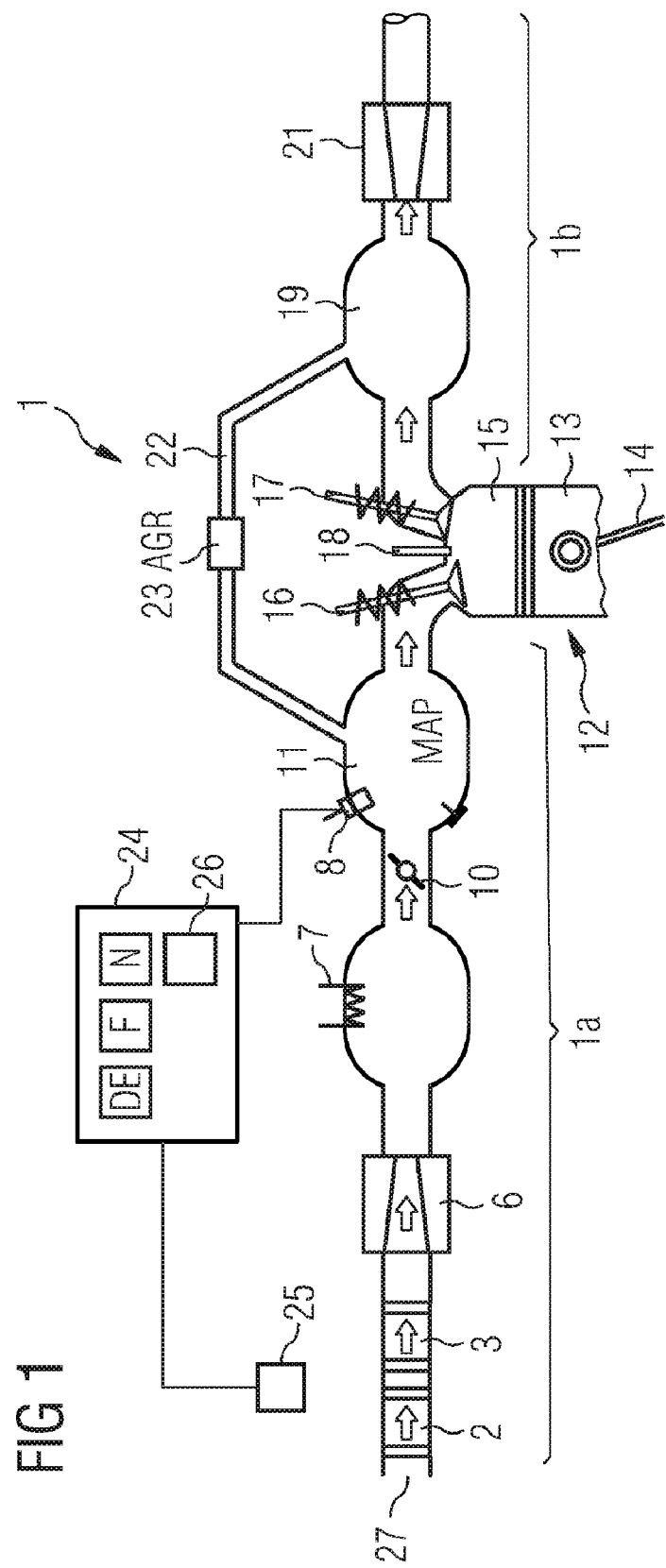

The method and/or device according to various embodiments offers the advantage that, if a fault symptom is detected in the engine or one of the vehicle devices, the selection and initiation of a limp-home function is determined not only on the basis of the type of fault symptom detected but also while simultaneously taking the actual driving state of the motor vehicle into account. The actual driving state of the motor vehicle is evaluated with the aid of a driving state evaluator on the basis of appropriate vehicle- and/or engine data that are transmitted to the driving state evaluator. From the received data the driving state evaluator determines a level of danger (criticality) that reflects an instantaneous evaluation of the driving state of the motor vehicle. In particular, the criticality is evaluated for example for an initiated overtaking maneuver if at that moment the torque and/or the rotational speed of the engine were to be limited and so the maximum torque and/or the maximum rotational speed were no longer to be available. It also seems particularly advantageous that a diagnostic device is further provided, which carries out a classification of the risk of damage occurring to the engine or a device, given a high torque and/or a high rotational speed of the engine. By taking into account the risk of consequences of a fault symptom as well as the criticality of the instantaneous driving state given instantaneous limitation of the torque, the initiated limp-home function of the motor vehicle is advantageously optimized. Thus, is it possible not only to reduce consequential damage to the engine and the vehicle devices but also in particular to improve the safety of the driver in moving traffic.

Advantageous developments and improvements of the method and/or device indicated in the subordinate claims 1 and 9 are provided by means of the measures indicated in the dependent claims. It is regarded as particularly advantageous that the optimized limp-home function is initiated immediately at the actual time. This may be carried out unconditionally in situations where the driving state evaluator classifies the criticality of the instantaneous driving situation as "non-critical". This is the case for example when the vehicle is traveling at low speed in urban traffic or the engine is running at no load. The necessary measures for the limp-home function arise in this situation exclusively from the nature and severity of the fault symptom that has arisen.

In the case of a risk classified as very "high" and a criticality classified as "non-critical", it is provided that the optimized limp-home function is initiated, albeit immediately, but in steps and/or in a ramp-shaped manner.

If, on the other hand, a "very critical" classification of the criticality is identified, then according to various embodiments it is provided that the optimized limp-home function is initiated at a later time. In particular, there is a wait until the criticality has once more reached the classification "non-critical" or until a defined waiting period has elapsed.

A further aspect according to various embodiments is that the driver of the motor vehicle is alerted to an imminent limitation of the torque or the rotational speed of the engine by means of a visual and/or audible information- and/or warning message. As a result of the prompt warning message the driver may select an appropriate mode of driving and for example avoid a risky overtaking maneuver.

In principle, the classification of both the risk inherent in the individual fault symptoms and the criticality of the driving state may be into any desired number of classes. According to various embodiments, for classification of the risk at least the classes "very low" and "very high" and for classification of the criticality the classes "non-critical" and "very critical" may be provided.

According to various embodiments it is further provided that the individual measures for the optimized limp-home function are stored in the form of a program. This advantageously allows, for various possible combinations of criticality and risk, an immediate determination of an appropriate measure for the limp-home function.

FIG. 1 shows in a diagrammatic representation an exemplary embodiment of an air path 1 of an internal combustion engine that has an intake tract 1a and an exhaust gas tract 1b and is usable for an engine, in particular for a diesel turbocharged engine. The air path 1 is tubular in shape and comprises in the left part of FIG. 1 an access opening, through which ambient air is fed into a combustion chamber 15 of a cylinder 12 of the engine. The ambient air fed to the engine has an ambient pressure AMP.

The ambient intake air is conveyed first through an air filter 2 (AIC, air cleaner) and an optional air-mass meter 3 (HFM) and then passes into the inlet opening of a compressor 6 (CHA, charger).

The arrows included in FIG. 1 show the direction of flow of the ambient intake air.

The air compressed by the compressor 6 passes through a charge-air cooler 7, a throttle valve 10 (THR, throttle), an intake manifold 11 (IM) and an inlet valve 16 into the combustion chamber 15 of the engine. Disposed downstream of the throttle valve 10 is a boost pressure sensor 8, which continuously acquires the boost pressure MAP (manifold pressure) and transmits it to the program-controlled arithmetic logic unit 24.

The cylinder 12 has a piston 13, which transmits its oscillating vertical motion to a connecting rod 14 and in so doing drives a crankshaft. There is further disposed on the cylinder head of the engine an injection valve 18, by means of which the fuel may be injected in a metered manner into the combustion chamber 15.

After combustion of the fuel-air mixture in the combustion chamber 15 an outlet valve 17 is opened so that the exhaust gas produced is conveyed through an exhaust manifold 19 into a turbine 21. The turbine 21 comprises for example adjustable turbine blades that drive the turbine at a high rotational speed. The turbine 21 is mechanically coupled to the compressor 6 and therefore drives the compressor 6 in dependence upon the exhaust gas stream. Disposed between the exhaust manifold 19 and the intake manifold 11 is an exhaust gas recirculation line 22, the passage of which is controllable by an exhaust gas recirculation valve AGR. Some of the exhaust gas stream may therefore be recirculated for afterburning in the combustion chamber 15, with the result that the exhaust gas emissions are improved.

If for example at the boost pressure sensor 8 a fault symptom is detected, this may lead to serious consequences for the turbocharger 6, 21 or—depending on the actual driving state of the motor vehicle—for the safety of the motor vehicle, as will be explained in more detail below.

As is further evident from FIG. 1, a diagnostic device DE, a driving state evaluator F and a limp-home device N are provided. The said devices DE, F, N are preferably integrated in the arithmetic logic unit (engine control unit) 24. Further provided is a memory 26, in which the received data are stored so as also to allow evaluation of the trend of the data. The functions of the said devices DE, F, N are described in detail below with reference to FIG. 2 and/or Tables 1 and 2 in FIG. 3.

In FIG. 2 a flowchart for an exemplary embodiment is represented, by means of which with the aid of an algorithm an optimized limp-home function A, B, C, D is determined for operation of an engine of a motor vehicle.

A central aspect according to various embodiments is that the driving state evaluator F continuously evaluates the actual driving state of the motor vehicle while simultaneously taking into account appropriate engine- and vehicle data. A further central aspect is that for the evaluated actual driving state of the motor vehicle a classification of the danger level (criticality) into classes is carried out. In so doing, actual values of appropriate vehicle data, for example from sensors such as a pedal-travel sensor, an acceleration sensor, the vehicle velocity, the engine rotational speed, the clutch switch or also information from other control- and navigation devices, for example coordinates of the road, a change of lane, steering angle, vehicle inclination etc., are taken into account. Furthermore, the previous trend of the received data is simultaneously used to define the best possible indication of the probability of the driving state. For example, it is checked how probable it is that there is instantaneously an overtaking maneuver and how critical it would be if at that moment an immediate limitation of the torque or of the rotational speed of the engine were to be initiated.

The driving state evaluator F therefore supplies weighted information about the criticality if at that moment the limitation of the torque and/or of the rotational speed is initiated.

A further central aspect is that the diagnostic device DE determines a fault symptom of the engine, the engine devices or the vehicle devices. For each fault symptom a classification of the risk of damage occurring at a high torque and/or a high rotational speed of the engine or the devices thereof is carried out. Both the risk of a detected fault and the criticality of the driving state are weighted in a plurality of classes and then, while simultaneously taking the severity into account, an appropriate limp-home function A, B, C, D is determined and initiated, as will be explained in detail below with reference to the flowchart of FIG. 2.

The flowchart initially starts in position 30. In position 31 the driving state evaluator F is activated and continuously receives the information supplied by the engine-/vehicle sensors and control devices and stores these values so as also to allow the trend of the information to be followed. For practical purposes it is provided that this operation runs continuously.

A diagnostic device DE is further activated, which monitors all of the relevant devices of the engine as well as the vehicle devices and checks for a possible fault symptom. In position 33 there is therefore continuous scanning to ascertain whether a fault symptom exists or not. If this is not the case, the program (at "no") jumps back to position 32. Otherwise (at "yes") a classification of the risk is requested in position 34. The risk classification is carried out from the viewpoint that, given a high torque, in particular given a requested maximum torque and/or a maximum rotational speed of the engine, damage may occur to the engine or to the devices that are to be taken into consideration. In accordance with the exemplary embodiment the risk weighting is effected into five classes:

a: very low
b: low
c: average
d: high
e: very high

A very low risk (class a) exists for example if the interior fan is defective. Such a fault has no influence on a high torque of the engine. If, on the other hand, the charge-pressure actuator cannot be electrically activated or the turbine blades of the turbocharger are no longer adjustable, then for the risk evaluation the probability that, given a high torque, the turbocharger will over-speed and hence break down is very high. Since the turbocharger is a very expensive component, in this situation a corresponding limitation of the torque has to be carried out in order to protect the turbocharger. In this case, the risk classification would be "very high" (e).

According to the flowchart of FIG. 2 there is therefore in position 35 an interrogation regarding the risk classification in the classes a to e. In position 35, therefore, for each detected fault symptom a corresponding classification of the risk is determined and stored.

It is additionally added that for every fault symptom such a risk classification exists.

In practice, any desired number of risk classes may be selected. It is provided that at least the class a: "very low" and the class e: "very high" are developed as these two classes are the easiest to assess in terms of potential damage.

For the driving state evaluator F a sequence similar to that for the diagnostic device DE is provided. In the driving state evaluator the driving state of the motor vehicle is evaluated from the viewpoint of which criticality will arise if at that moment a limitation of the torque or of the rotational speed is initiated. The criticality of the driving state is carried out in position 36. The classification of the criticality of the driving state therefore provides information about whether a limitation of the engine torque at that moment is "non-critical" or possibly "very critical" if for example an overtaking maneuver has been initiated. In accordance with to the exemplary embodiment the classification of the criticality is effected into three classes:

a: non-critical
b: unknown
c: very critical

The classification of the criticality is carried out continuously for each driving state and in position 37 corresponding criticality information is determined.

Checking the risk of a detected fault symptom as well as the interrogation of the criticality classification of the actual driving state is effected in parallel with respect to time and continuously. On the basis of the information established in position 35 and 37, in position 38 a corresponding limp-home function A, B, C, D is determined, as is evident from Table 2. Determination of the limp-home reaction is effected in dependence upon the class of risk and the criticality in accordance with Table 1, as is explained in detail below.

In Table 1 of FIG. 3 the classes IIa, IIb, IIc, IId and IIe of the risk R are listed in the individual columns. The classes IIIa, IIIb and IIIc of the criticality are entered in the corresponding lines. As optimized limp-home functions the functions A, B, C and D are specified in Table 1. The optimized limp-home functions may of course be selected in any desired manner and determined for example in dependence upon the type of engine or vehicle.

In accordance with the embodiment the optimized limp-home functions A, B, C, D in Table 2 are explained in detail. As is evident from Table 2, in the case of the optimized limp-home function A the limitation of the torque and/or of the rotational speed of the engine is initiated immediately (not in steps or in a ramp-shaped manner).

In the case of the optimized limp-home function B the limitation of the torque and/or of the rotational speed, while being initiated immediately, is however executed in steps and/or in a ramp-shaped manner.

In the case of the optimized limp-home function C the limitation of the torque and/or of the rotational speed is carried out in a delayed manner, i.e. the limitation of the torque is not initiated until the driving state evaluator F evaluates the actual driving state no longer as "unknown" or "very critical" but as "non-critical". The engine control unit 24 therefore has to delay the limitation of the torque and/or of the rotational speed until the actual driving state allows a limitation of the torque.

In the case of the optimized limp-home function D the procedure is similar to that in the case of the limp-home function C. However, in the case of the optimized limp-home function D the time delay is limited to a maximum time value. In this case, it is assumed that the limitation of the torque and/or of the rotational speed cannot be delayed for an indefinite time without damage occurring to the engine or to one of the vehicle devices.

Table 2 of FIG. 3 further shows in the righthand column that in addition to the limitation of the torque and/or of the rotational speed visual and/or audible information about the limitation of the torque and/or of the rotational speed is provided. In case A the information: "limitation of the torque and/or rotational speed is active" appears for example on a display. In case B the information that the "limitation of the torque and/or rotational speed is being progressively initiated" appears. After the limitation has been initiated, fresh information that the "limitation is active" then appears.

In case C the information and/or an advance notice that the limitation of the torque and/or rotational speed will be "initiated soon" appears. After the limitation has been initiated, the information that the "limitation is active" then appears.

In case D the information and/or an advance notice that the "limitation of the torque will occur at the latest in xxx seconds" appears. After the limitation has been initiated, the new display that the "limitation of the torque and/or rotational speed is active" then occurs.

In the event of a change in the driving situation, these displays are updated accordingly.

For a better understanding of the various embodiments, the method is described in detail once more below with reference to three examples.

In a first example, as a starting situation it is assumed that an electrical fault has been detected between the charge-pressure actuator for the turbocharger and the electronic control unit. This is a serious fault symptom as the turbocharger may be destroyed and high repair costs may therefore be incurred. The probability that, given a high torque, the turbocharger may be damaged or destroyed is therefore very high. The risk R is therefore classified in accordance with FIG. 2, position 35 as "very high". This results in the class IIe for the risk R. The limitation of the torque and/or of the rotational speed should therefore be initiated as quickly as possible.

The driving state evaluator F identifies for the instantaneous driving state of the motor vehicle that the probability of an overtaking maneuver being initiated at that moment is low, i.e. a limitation of the torque at that moment is "non-critical". The classification of the criticality G is therefore class IIIa (see FIG. 2, position 37).

With the two evaluations of the risk R (IIe) and the criticality G (IIIa) there arises from Table 1 according to column IIe and line IIIa the limp-home function A, i.e. according to Table 2 the limitation of the torque and/or of the rotational speed may be initiated immediately and unconditionally. A maximum level of component protection is therefore achieved without endangering the driver, other road users or the motor vehicle. On the other hand, it is also guaranteed that the driver of the vehicle still has as high a torque as possible available to him for continuing to drive his vehicle until the fault has been rectified for example in a repair shop.

In a second example, the same fault symptom as was described previously in the first example is assumed. The risk R of damage therefore still corresponds to class IIe ("very high").

However, in this case the driving state evaluator F identifies that the probability of an overtaking maneuver is impossible to evaluate precisely. The classification of the criticality G is however then class IIIb: "unknown" (see FIG. 2, position 37).

As an optimized limp-home function for this situation according to Table 1 the limp-home function B is found from line IIIb and column IIe. This means that in accordance with Table 2 the limitation of the torque and/or of the rotational speed, while being initiated immediately, is however executed in steps and/or in a ramp-shaped manner.

In a third exemplary embodiment, it is assumed that the boost-pressure sensor has a fault. The evaluation of the risk R in this situation is assumed to be "low" in accordance with class IIb (FIG. 2, position 35). In this case the risk R of destruction of the turbocharger given maximum torque is relatively low since control technology still allows a switchover to pilot-operated turbo-charging and so, in general, an adequate level of component protection is achieved. However, this does not apply if there is a double fault in the system or an extremely disadvantageous combination of limit components.

The driving state evaluator F evaluates the probability of an overtaking maneuver being initiated at that moment as "unknown", with the result that according to position 37 in FIG. 2 the class IIIb is determined.

From Table 1 there therefore arises according to line IIIb and column IIb the optimized limp-home function C. In the case of the limp-home function C the initiation of the limitation of the torque and/or of the rotational speed is delayed until the driving state evaluator F displays "non-critical" (IIIa). At the same time, there appears on the display the advance notice that the "limitation of the torque and/or rotational speed will be initiated soon".

Once the class (IIIa) "non-critical" has been reached, the limitation of the torque and/or of the rotational speed is initiated and the fresh information that the "limitation of the torque and/or rotational speed is active" appears on the display. In this case too, the vehicle system is usable with maximum availability and controllability. Component protection is markedly secondary to the driving situation.

Owing to the latent danger of destruction of the turbocharger, however, the limitation according to the limp-home function C cannot be delayed for an indefinitely long time. According to various embodiments it is therefore provided that a limp-home function D is used once a defined waiting period (maximum time limit) has elapsed. At the same time, first an advance notice that the "limitation of the torque and/or rotational speed will occur at the latest in xxx seconds" appears on the display for the driver. Once this period of time has elapsed, the information that the "limitation of the torque and/or rotational speed is active" then appears. The limitation of the torque in this case is effected with the aim of allowing the vehicle to be operated with its maximum availability in order to prevent an accident. Component protection in this driving situation is secondary.

According to various embodiments it is provided that the method is usable to determine an optimized limp-home function for all types of engine, in particular also for an electrically operated or gas-operated engine.

What is claimed is:

1. A method of determining an optimized limp-home function for an engine of a motor vehicle, the engine including a device configured to limit, at least one of a torque and a rotational speed of the engine in the event of at least one fault symptom, the method comprising:
determining, based on actual values of at least one of appropriate vehicle-data, engine data, and a previous trend thereof, an actual driving state of the motor vehicle,
determining, for the determined actual driving state of the motor vehicle, a classification of criticality associated with a supposed, but not implemented, decrease or limitation of torque or rotational speed of the engine, detecting a fault symptom of the engine or a vehicle device, determining, for the detected fault symptom of the engine or vehicle device, a classification of risk of damage that would occur to the engine or vehicle device at a supposed, but not implemented, high torque or high rotational speed of the engine, and determining an optimized limp-home function based at least on the determined classifications of criticality and risk.

2. The method according to claim 1, wherein the optimized limp-home function is initiated immediately if the criticality of the driving state has been classified as "non-critical".

3. The method according to claim 2, wherein the optimized limp-home function is initiated immediately but in steps or in a ramp-shaped manner if the risk of the fault symptom has been classified as "very high" and the criticality of the driving state has been classified as "unknown".

4. The method according to claim 1, wherein the optimized limp-home function is initiated in a delayed manner only after the classification of the criticality of the driving state has been brought back from "unknown" or "very critical" to "non-critical" or after a defined time delay has elapsed.

5. The method according to claim 1, wherein at least one of a visual message, audible information-message, and warning message is output to the driver of the motor vehicle if the torque or the rotational speed of the engine is being limited.

6. The method according to claim 1, wherein for the classification of the risk at least the classes "very low" and "very high" are defined.

7. The method according to claim 1, wherein for the classification of the criticality at least the classes "non-critical" and "very critical" are defined.

8. The method according to claim 1, wherein measures for the optimized limp-home function are stored in the form of a program.

9. A device for determining an optimized limp-home function for an engine of a motor vehicle, comprising:
   a driving state evaluator configured to:
      determine an actual driving state of the motor vehicle, and
      determine, based on the determined actual driving state of the motor vehicle, a classification of criticality associated with a supposed, but not implemented, decrease or limitation of torque or rotational speed of the engine,
   a diagnostic device configured to determine, based on a detected fault symptom, a classification of risk of damage that would occur to the engine or motor vehicle at a supposed, but not implemented, high torque or high rotational speed, and
   the limp-home device comprising an algorithm configured to determine an optimized limp-home function based at least on the determined classifications of risk and criticality.

10. The device according to claim 9, wherein the optimized limp-home function is stored in the form of a program.

11. The device according to claim 9, wherein at least one of the driving state evaluator, the diagnostic device and the limp-home device are integrated in an engine control unit.

12. A system for determining an optimized limp-home function for an engine of a motor vehicle, the engine including a device configured to limit at least one of a torque and a rotational speed of the engine in the event of at least one fault symptom, the system being operable to:
   determine, based on values of at least one of appropriate vehicle-data, engine data, and a previous trend thereof, an actual driving state of the motor vehicle,
   determine, for the determined actual driving state of the motor vehicle, a classification of criticality associated with a supposed, but not implemented, decrease or limitation of torque or rotational speed of the engine,
   detecting a fault symptom of the engine or a vehicle device,
   determine, for a detected fault symptom of the engine or of one vehicle device, a classification of risk of damage that would occur to the engine or vehicle device at a supposed, but not implemented, high torque or high rotational speed of the engine, and
   determine an optimized limp-home function based at least on the determined classifications of criticality and risk.

13. The system according to claim 12, wherein the optimized limp-home function is initiated immediately if the criticality of the driving state has been classified as "non-critical".

14. The system according to claim 12, wherein the optimized limp-home function is initiated immediately but in steps or in a ramp-shaped manner if the risk of the fault symptom has been classified as "very high" and the criticality of the driving state has been classified as "unknown".

15. The system according to claim 12, wherein the optimized limp-home function is initiated in a delayed manner only after the classification of the criticality of the driving state has been brought back from "unknown" or "very critical" to "non-critical" or after a defined time delay has elapsed.

16. The system according to claim 12, wherein at least one of a visual message, audible information-message, and warning message is output to the driver of the motor vehicle if the torque or the rotational speed of the engine is being limited.

17. The system according to claim 12, wherein for the classification of the risk at least the classes "very low" and "very high" are defined.

18. The system according to claim 12, wherein for the classification of the criticality at least the classes "non-critical" and "very critical" are defined.

19. The system according to claim 12, wherein measures for the optimized limp-home function are stored in the form of a program.

20. The method according to claim 1, wherein the step of determining a classification of the criticality comprises determining a probability that currently a critical driving state exists.

* * * * *